Fig. 2.

April 16, 1935.  F. J. SCHRAEDER, JR  1,998,290
METHOD AND APPARATUS FOR STORING AND RECLAIMING VEHICLES
Filed April 26, 1930   7 Sheets-Sheet 4

INVENTOR-
FRANK J. SCHRAEDER JR.
BY  Frank J Schraeder Jr
ATTY.

April 16, 1935.　　　F. J. SCHRAEDER, JR　　　1,998,290
METHOD AND APPARATUS FOR STORING AND RECLAIMING VEHICLES
Filed April 26, 1930　　　7 Sheets-Sheet 6

INVENTOR-
FRANK J. SCHRAEDER JR.
By Frank J Schraeder Jr
ATTY.

Patented Apr. 16, 1935

1,998,290

UNITED STATES PATENT OFFICE 1,998,290

METHOD AND APPARATUS FOR STORING AND RECLAIMING VEHICLES

Frank J. Schraeder, Jr., Glen Ellyn, Ill., assignor, by mesne assignments, to Mechanical Parking Patents, Inc., Chicago, Ill., a corporation of Illinois Application April 26, 1930, Serial No. 447,624

16 Claims. (Cl. 214—16.1)

This invention relates to a system for storing and distributing automobiles and to a garage in which the system can easily be reduced to practice.

The problem of providing suitable storage space for automobiles has become an acute one in all large cities where a great number of cars are used for carrying at predetermined times a large number of people to a relatively small zone of the city, as for instance to the business district, and where at other relatively short periods of time the same part of the population again returns to the outlying districts. The attempt of solving this problem by providing public parking space or garages in which the vehicles can be left for a portion of the day were partly successful only owing to the difficulties in getting the individual cars to stalls chosen more or less at random and still more owing to the difficulties of extracting the cars practically at the same time from the storage space.

The present invention has the object of providing a system of facilitating the storage of power vehicles in an area in which every portion is utilized either for storage purposes or for the purposes of distributing the cars to and from these storage spaces or stalls.

Another object of the invention is to provide a system and a garage in which the task of positioning the cars upon their approach to the storage space and the removal of the cars from the storage stalls to a drive-off is greatly facilitated by the provision of an inlet and outlet which is wide enough to permit the simultaneous passage of a plurality of cars disposed abreast of each other and in which the individual cars can be handled rapidly without interfering with each other.

It is also an object of the invention to provide a system and a garage in which the distribution of the cars to the selected stalls and their return from the same is effected without filling the storage area with the exhaust gases of the engines, the movements of the cars being carried out by specially constructed transfer devices instead of utilizing the engines of the vehicles. Another object of the invention is to provide a system and garage in which the positioning of the vehicles to properly selected stalls is effected without the use of turntables and in which in spite of this lack of turntables the cars may be removed from the approach to the stalls and from the stalls to the drive-off so that the cars will face in the proper direction for immediately leaving the storage area without coming into conflict with approaching cars or with other cars which are also on their way from the storage space.

With these and numerous other objects in view, embodiments of the invention are described in the following specification in which reference is had to the accompanying drawings.

Figure 1:
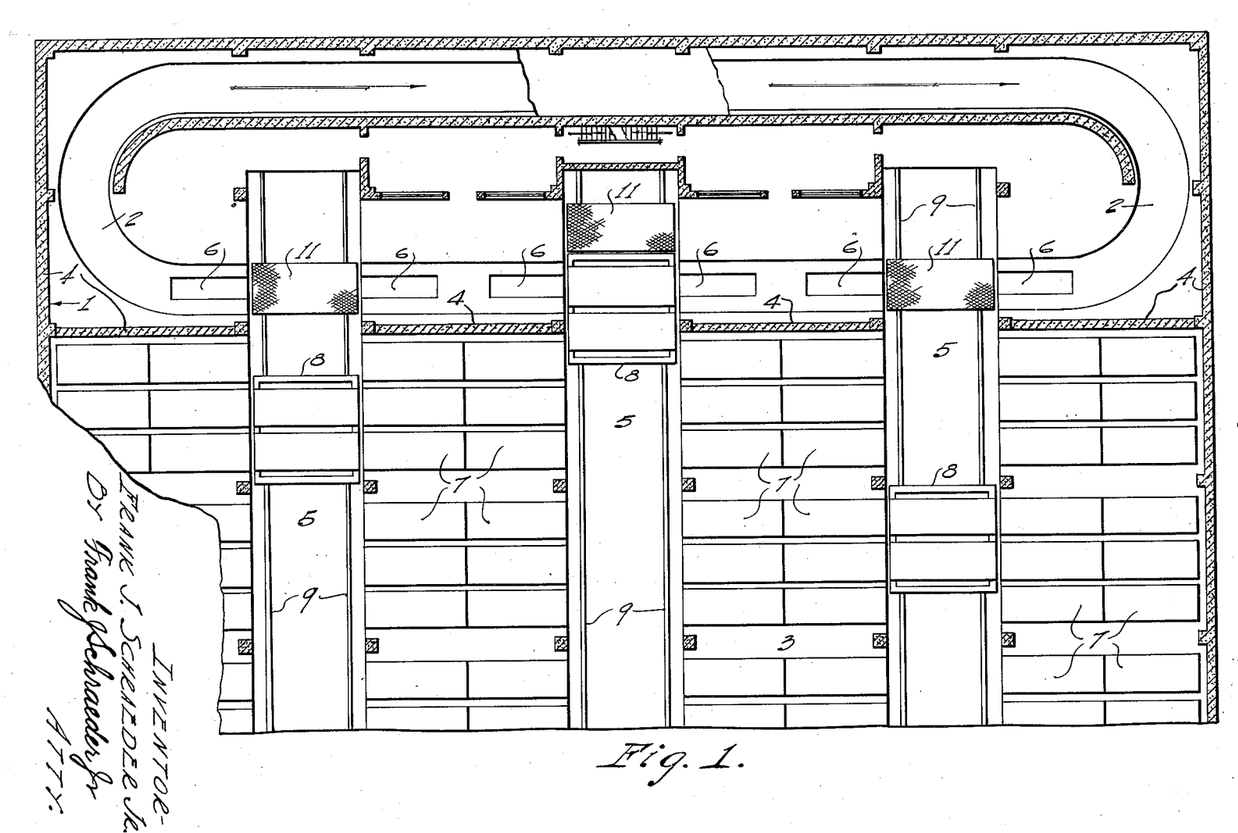
Figure 1 is a plan view of a storage floor of a garage of this type.

The motor cars entering the building 1 through a door which is not illustrated in Fig. 1 then may drive under their own power in a predetermined direction on the ramp 2 which may be level or inclined relatively to the storage area. This driveway 2 preferably is separated from the storage area 3 by a partition wall 4 to avoid dispersion of the exhaust gases of the engines over the part of the building in which the cars are stored. The driveway 2 is preferably wide enough to permit the simultaneous passage of a plurality of cars disposed abreast of each other.

The driveway or ramp 2 may have directional indications, as for instance, an arrow or similar symbols, to point the way in which the cars are to approach the storage area 3. As shown in Figure 1 this ramp is built in the form of an elongated loop, one part of which lies close to the outer wall of the building.

Figure 2:
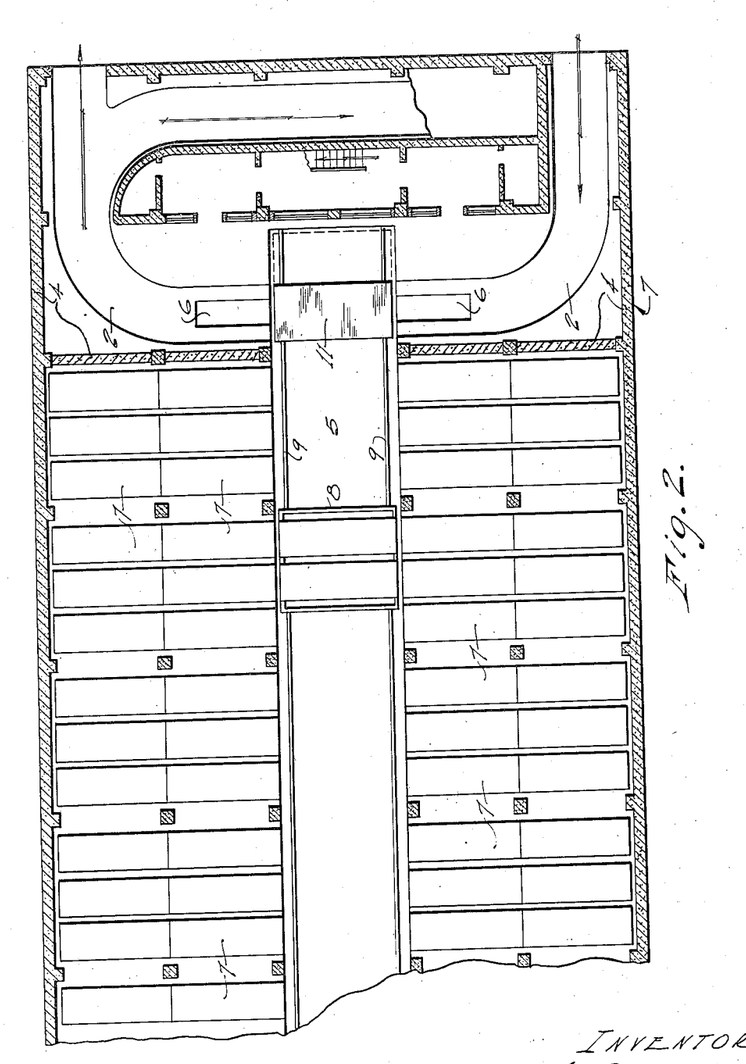
Figure 2 is a plan view of a modified smaller building serving the same purpose.

The other portion of this loop is intersected by a plurality of branch ways or distributing ways 5 of which in Fig. 1 three are indicated, while, according to Fig. 2 a single distributing way 5 is shown. Adjacent the intersections of these distributing ways 5, which are in the form of elongated transverse grooves, with the non-depressed portion of the ramp, the latter is provided with pits 6 to facilitate the transfer of the cars to positioning trucks, or if the transfer truck or trucks are already at the intersection or intersections, the cars may be driven directly thereon without necessitating their movement on to the truck by the mechanical device 10.

The transfer of the cars from the driveway 2 to any one of the selectively determined stalls 7 is effected through a truck 8 especially equipped for the purpose of simultaneously receiving a plurality of cars and carrying the vehicles to selected stalls in any group of stalls with which said transfer truck is primarily associated.

It will be seen, that for instance the transfer truck 8 located in the central branch 5 is primarily intended for carrying the cars selectively to any one of the stalls disposed at either side of this branch way 5, while the transfer truck 8 in either of the other branches 5 will primarily take care of the delivery of cars to and their removal from the pertaining end group of stalls.

The motor vehicles arriving at a point of intersection from which they are to be positioned in a selectively determined stall of a group are positioned on the transfer truck which also then has been moved to this point of intersection. The truck 8 then moves on the track 9 of the depressed branch way 4 until it arrives in opposition to the selected stall 7. A mechanical device 10 on the transfer truck then removes the vehicle therefrom and shifts it to the selected stall.

In order to permit the vehicle to travel past one or more of the intersections of the ramp 2 and distributing ways 5, the latter are provided with bridges or movable platforms 11, which normally permit any vehicle to travel thereover if they are in operative position. The top surface of each of these bridges 11 is preferably located in the plane or level of the ramp 2. The platforms are mounted on wheels 12 adapted for traveling on the track 9 in the depressed distributing way 5.

Figure 3:
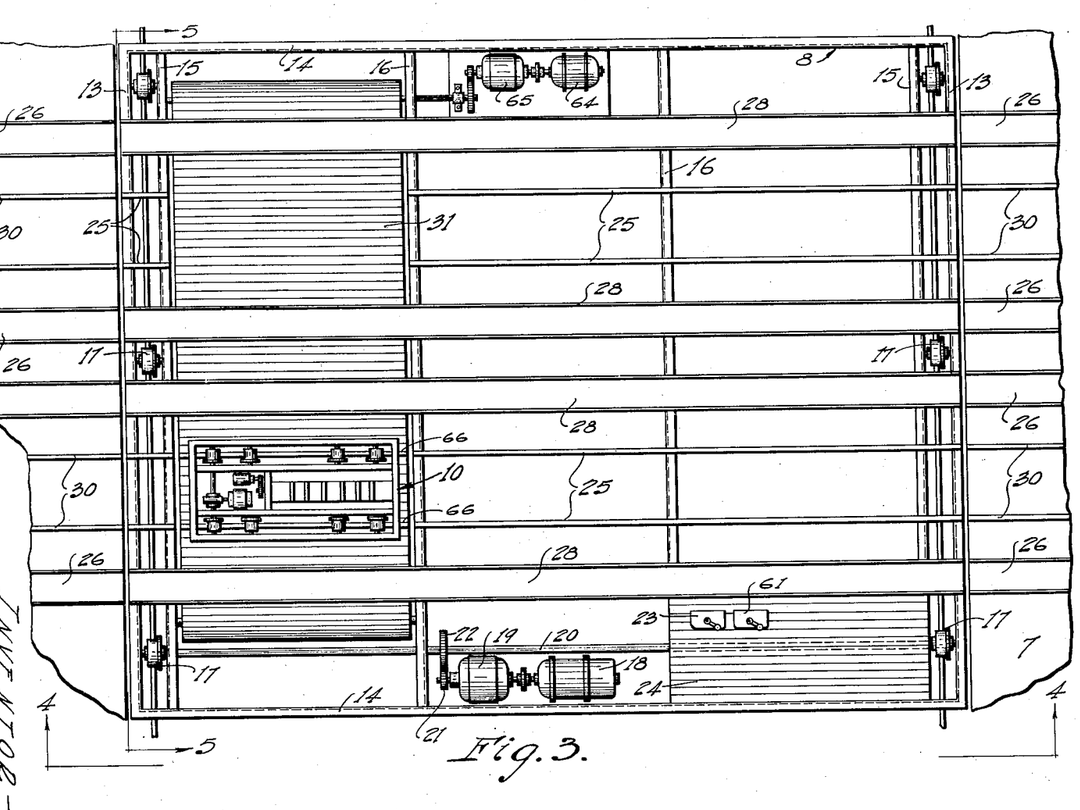
Figure 3 is a plan view of a transfer truck for distributing the cars.
Figure 4:
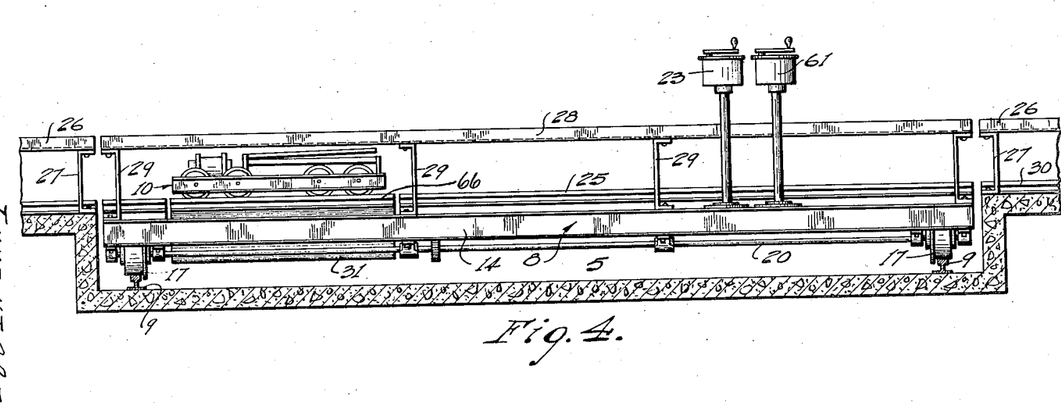
Figure 4 is a side view of this transfer device, partly in section on line 4—4 of Figure 3.
Figure 5:
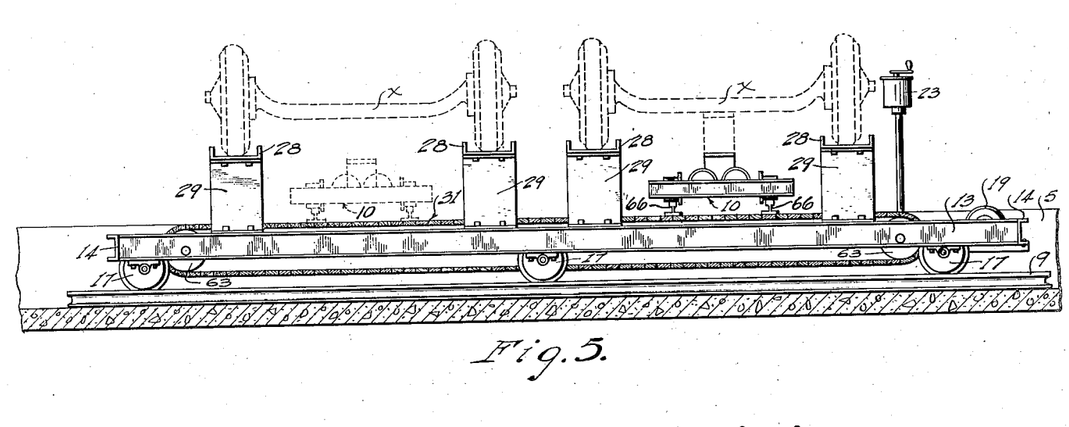
Figure 5 is a front view partly in section on line 5—5 of Figure 3.
Figure 6:
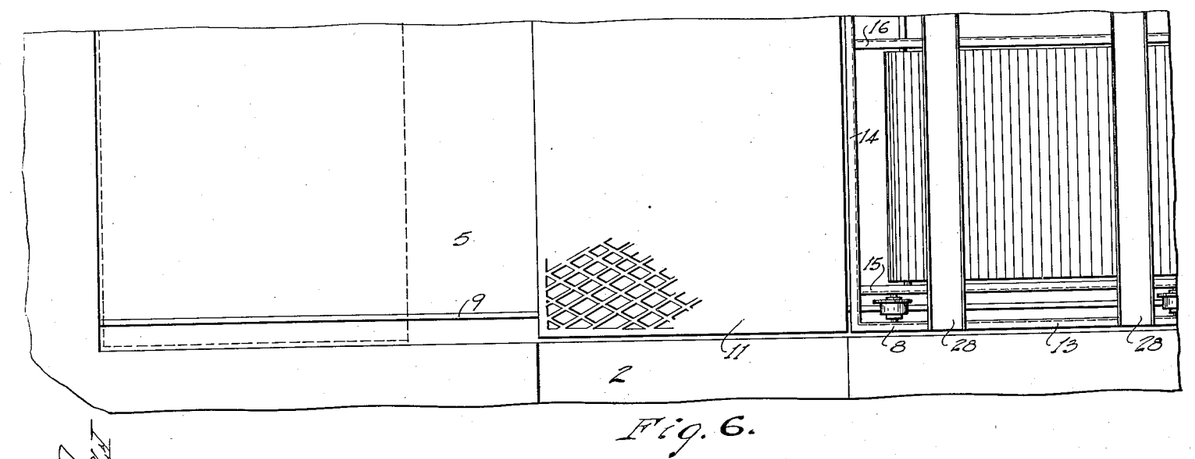
Figure 6 is a top plan view of a movable bridge or platform forming a part of the system.

The construction of the transfer trucks 8 is shown in detail in Figs. 3, 4 and 5. The truck may comprise a frame structure 13 of substantially rectangular shape having outer longitudinal frame members 13, transverse members 14 and reinforcing longitudinal members 15 and 16. The frame members 13 and 15 are suitably spaced to permit the wheels 17 to be positioned between the same.

From Fig. 3 it will be seen that on each side of the transfer truck 8 three of these wheels 17 are mounted, and that one set of wheels may be positively actuated through a motor 18 mounted on the truck, and which operates through a reduction mechanism 19 to drive the transverse shaft 20 at the ends of which the two respective wheels 17 are positioned. The reduction mechanism 19 drives this transverse shaft 20 through the gearing 21 and 22.

The motor itself is controlled in any desired way,—a controller being indicated at 23 mounted on a platform 24 on which the attendant may take his stand. The supply of electric current for the motor is not shown in the drawings, but the feed of current and control may be effected in any desired way.

The frame members 13, 15 and 16 of the transfer truck 8 serve for supporting rails 25 fixedly thereon to permit travel of the mechanism 10 through which the individual cars if desired may be withdrawn from the ramp 2 to be positioned on the truck or to shift the car from the truck 8 to any selected stall 7. These mechanisms or parkers 10 also are utilized for withdrawing a car from any selected stall, and if desired for shifting it from the truck 8 at any intersecting points with the ramp 2 to the latter. While in the embodiments illustrated each truck is shown provided with two sets of these rails, it is obvious that the invention is not limited to this number.

The stalls 7 are provided with guide ways or channels 26 for receiving the cars, although these channels are not shown for the sake of clearness in Figures 1, 2, 7 and 8. These guide channels are supported on suitable brackets 27, as clearly shown in Figs. 4 and 5. The transfer trucks 8 also are equipped with guide channels 28 supported on brackets 29 so as to lie in the same horizontal planes as the guide channels 26 of the stalls.

As in the embodiments illustrated, the transfer truck 8 is shown to be equipped with a double set of rails 25 in parallel arrangement. It is also equipped with a double set of guide channels 28, whereby the truck becomes adapted for transfer of a plurality of cars at one time, and whereby the flexibility of the system in general is greatly enhanced.

Owing to the provision of the raised guideways 26 on the stalls 7 the proper positioning of the cars in the stalls, the insertion and their removal is greatly facilitated. At the same time this arrangement permits rails 30 to be placed beneath and between said channels 26 to permit the parker 10 to be advanced into the stalls for placing the cars therein or removing them therefrom.

For the purpose of positioning the loading mechanism or parker 10 on the transfer truck 8 selectively in readiness for travel on any one of the sets of rails 25, there is provided an endless carrier by means of which the parker 10 may be properly placed. The endless carrier 31 acts as a shiftable support for the parker 10 and is illustrated by way of example as an endless conveyor, although it is obvious that any other displaceable support may be used for the same purpose.

The endless carrier is trained about two rollers 63, Fig. 5, of which one is actuated by a motor 64 through a suitable reduction mechanism 65. It is obvious that this motor also is started and stopped by means of one of the controllers 23 or 61 to effect a transverse shifting movement back or forth of the parker 10. The endless carrier 31 is equipped with a pair of rails 66 which may be selectively placed in alignment with either of the rails 25 of the truck to permit the parker then to advance over the selected pair of rails.

The operative plane of the shiftable support 31 of the parker 10 is considerably below the traveling plane of the motor vehicles determined by the bottom surface of the guide ways 26 or 28. For the purpose of permitting the parker 10 to travel from the transfer truck to any of these stalls to attach itself operatively to the axle, front or rear, of any selected vehicle stored therein, the parker is constructed as a mechanism of relatively low height and is adapted to pass, when on its shiftable support 31, underneath the guideways 28 which are for this purpose supported in raised position on the brackets 29, and underneath the plane of the guideways 26 on which the stored cars stand.

The detailed construction of the parker is apparent from Figs. 10 to 13. The parker mechanism comprises a frame structure consisting of the channel bars 32 and 33 and additional channel bars 34 parallel to the longitudinal bars 33, this entire frame structure being supported on the wheels 35. The front pair of these wheels may be positively driven by a shaft 36 extending transversely through the frame and associated with a reduction mechanism of which the casing 37 only is shown. This reduction mechanism is actuated by a motor 38 which is mounted on a low platform 39 secured to the frame structure.

The same platform also may carry another motor 40 whose armature shaft drives by pinion 41 and gear 42 a spindle 43 having its front end supported in a bearing on another narrower platform 44, and having its rear end mounted in another bearing on a third transverse platform 45.

The spindle 43 is provided with right and left hand thread as indicated at 46 and 47 and nuts 48 and 49 are adapted to travel on the thread partitions 46, 47 respectively, whereby upon rotation of the spindle in a predetermined direction the two nuts obviously will travel in opposite directions.

With each of the nuts a pair of links 50, 51 respectively is pivotally connected, the outer ends of the links being pivotally secured to a frame member 52 in the form of a channel bar extending longitudinally of the parker 10. The channel 52 is fixedly connected at its front and rear end with upright channels 53, 54 so that upon a lifting movement being imparted to the longitudinal channel 52 these vertical channels 53, 54 also are raised or lowered accordingly.

A supplementary member 55 is hingedly attached to the top of the vertical channel member 53 and the rear of said member 55 is yieldingly braced from the main member 52 as by a spring 56 with which the sets of links are pivotally connected. Owing to the insertion of a yielding spacing element 56, the rear portion of the auxiliary member 55 normally will assume a somewhat more elevated position than the front part thereof.

Upon actuation of the motor 40 and rotation of the screw spindle 43, the links will impart a lifting movement to the entire super-structure just described, the outer ends of the links 50, 51 being constrained to travel in a predetermined vertical plane while the inner ends of the links are constrained to travel in the horizontal plane containing the axis of the spindle 43.

The entire super-structure comprising the channel members 52, 55, 53, 54 is held against shifting from its vertical plane owing to the provision of guiding means in the form of rollers 57 rotatably mounted on brackets 58 which are carried by the transverse reinforcing members 59 and end channel 32 respectively, and which frictionally engage the bottom surface of the vertical channel members 53, 54 of the movable super-structure.

If upon elevation of this super-structure the upper channel 55 should strike an obstacle as for instance the lower face of the axle x of a vehicle, the elevating movement may still be continued, but at the same time the spring 56 interposed between the two supporting members 52, 55 is gradually placed under stronger compression. The upper auxiliary contact member 55 will thereby be forced downward relatively to the lower part 52 and will finally influence through this downward shifting movement a switch 60 mounted on the primary supporting element 52 of any desired construction.

This switch will automatically interrupt the flow of current to the motor 40 even though the attendant operating the controller 61 for the parker should fail to notice this super-structure with its engagement with the axle. The motor, therefore, will be stopped; the axle of the vehicle is now engaged by the contact member 55, and the parker structure 10 in its entirety now forms a transfer mechanism for the vehicle which is engaged thereby.

The contacting structure comprising the links 50, 51, nuts 48, 49 and spindle 43 is a self-locking structure, eliminating thereby the danger of the vehicle disengaging during its transfer which is now induced by the travel of the parker 10 on the rails 25, 30.

For the purpose of insuring the retainment of the axle of the vehicle in position on the parker 10, while the latter is traveling, the auxiliary member 55 may, if so desired, be provided with projections as cleats 62. Owing to the fact that this member 55 is raised and contacted with pressure of the spring 56 under the axle $x$ of the vehicle, it may engage the axle $x$ directly on any of the cleats 62 to thus move the car but if during the movement of the parker, the axle should slip it will be engaged then between any pair of such cleats 62.

The travel of the vehicles upon entering or leaving the garage being a uni-directional one, it is necessary that at the points of intersection between the ramp 2 and the branch ways 5 means should be provided for temporarily permitting the passage of the vehicles over the branchway in case the transfer truck 8 should not be positioned at that intersection. This temporary support for vehicles at those intersections is afforded by the movable bridge 11, the details of which are apparent from Figures 1, 2 and 6 to 8.

The super-structure of this bridge maintains the platform on the same level on which the ramp 2 and guide channels 28 are located.

Means are provided for automatically shifting this movable bridge away from the point of intersection of ramp 2 and branch way 5 when the transfer truck 8 approaches said intersection, and for automatically returning the bridge to this intersection when the transfer truck leaves the same, so that at all times a properly levelled support for vehicles is present at these points of intersection.

Figures 7, 8:
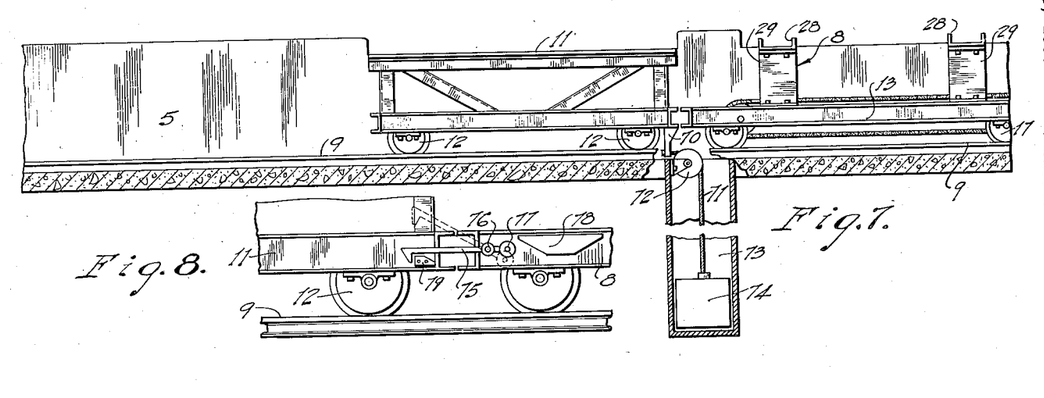
Figure 7 is a side elevation partly in section of the movable bridge or platform and associated mechanism.
Figure 8 is a fragmentary side elevation of a modified bridge and pertaining mechanism.
Figure 9:
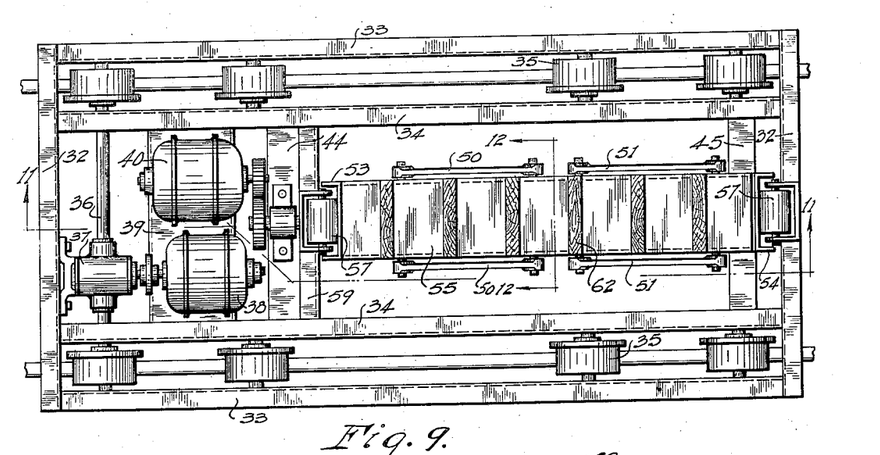
Figure 9 is a top plan view of a loading mechanism or parker forming a part of the transfer device.
Figure 10:
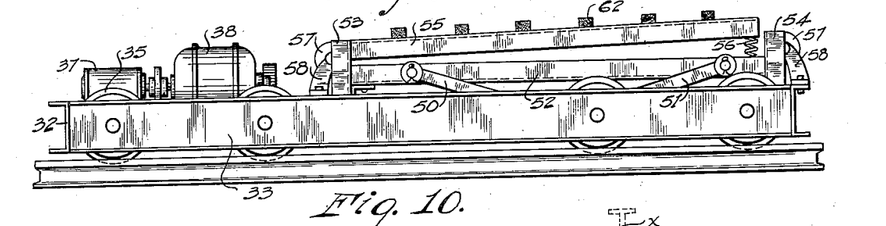
Figure 10 is a side elevation of the same.
Figure 11:
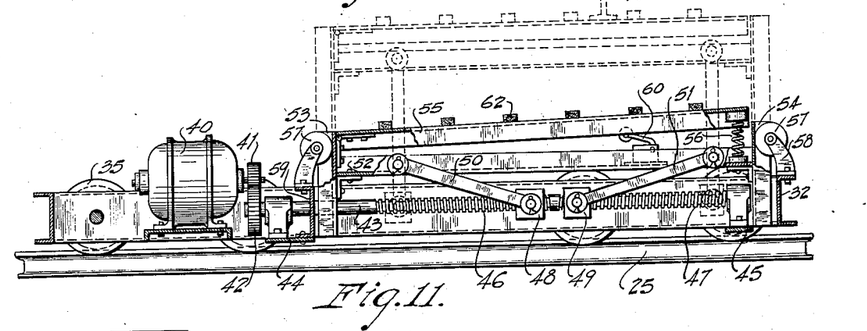
Figure 11 is an elevation partly in section on line 11—11 of Figure 9.
Figure 12:
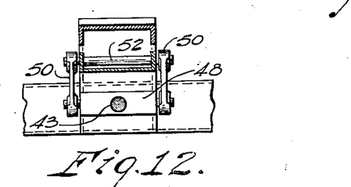
Figure 12 is a detail section on line 12—12 of Figure 9.
Figure 13:
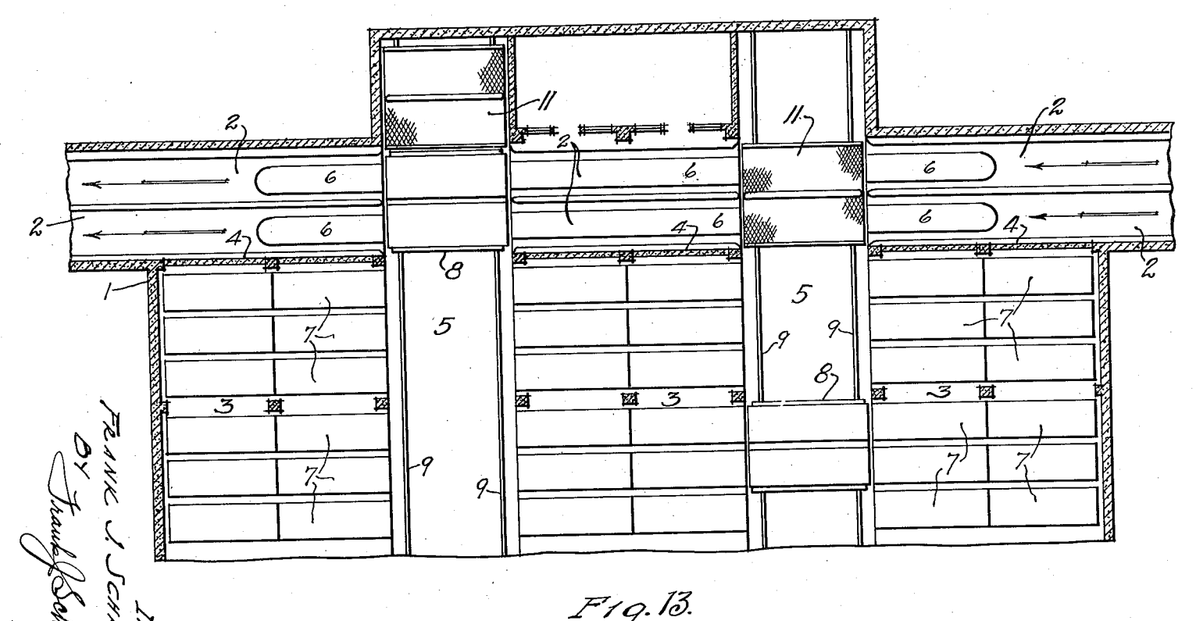
Fig. 13 is a cross-section of a garage building showing a portion of a storage floor wherein the driveway is wide enough to permit the simultaneous landing of a plurality of cars upon the transfer truck.

From Figure 7 it will be seen that the truck frame of the movable bridge 11 has a bracket 70 to which the end of a cable 71 is secured. This cable is guided over a sheave 72 mounted at the top of a pit 73 in the branch way 5 adjacent the ramp 2. The cable 73 supports at its other end a counter-weight 74, whereby the roller bridge is automatically returned to the point of intersection between branch way 5 and ramp 2 when the transfer truck 8 recedes from this point while upon approaching the intersection, the transfer truck 8 itself will push the bridge ahead of it and thereby will momentarily take the place of the bridge at the intersection.

In the modification illustrated in Figure 8 the truck 8 is provided with a coupling hook 75 pivotally mounted at 76 and having a roller 77 at one end. A stationary cam 78 adjacent the path of the truck engages the roller 77 to cause the coupling hook to rock, whereupon after passage past the cam the hook drops behind the lug 79 of the bridge while the latter is moved back with the positively actuated truck. Upon return movement of the truck 8 the cam 78 again actuates the coupling hook automatically to release position so as to leave the bridge at the point of intersection while the truck 8 moves into the car storage area.

The operation of this system of distributing vehicles will be apparent from the above. The vehicles approach the ramp 2 and travel, either under their own power or in some other way, to any selected point of intersection. The distributing truck 8 moves to said point, displacing thereby the movable bridge 11. The cars may be moved directly on to the truck 8, or the parker 10 on this truck 8, having first been set by means of the reciprocating support 31 to alignment with the proper pair of rails 25, is then advanced on the rails 25 of the truck until positioned in a pit 6 of the approach 2 underneath the car whose wheels rest on a level high enough to permit the parker 10 to be shifted under the axle $x$. After the axle has been engaged by the parker the latter is again withdrawn to move the car on to the truck 8. The loaded truck is then moved on the depressed track 9 until the car (or cars) thereon is in opposition to a selected stall 7, and again the parker is advanced on the rails 25 to push the selected car on the guide ways 26 of the stall.

Similarly also upon withdrawal of a car from a stall through proper sequential actuation of parker and truck, the car (or cars) is ultimately delivered at the point of intersection, facing in the proper direction to leave the garage.

I claim:

1. In car transfer apparatus, a movable structure adapted to carry a plurality of cars, a plurality of elevated tracks mounted on said structure and arranged to guide the wheels of a plurality of cars placed side by side on said structure, means for moving said structure, mechanism adapted to be shifted beneath said tracks and to contact a selected car and to move same off and onto said structure, and means for shifting said mechanism on said structure into operative position with a selected car.

2. The combination with a plurality of storage compartments having guiding means therein, of a transfer apparatus comprising a movable truck adapted to simultaneously carry a plurality of vehicles, elevated guide tracks for the wheels of said vehicles, means for moving said truck, mechanism adapted to contact a vehicle and lift one end thereof to move said vehicle on said elevated guide tracks on and off said truck respectively from or into a selected storage compartment, a reciprocatory support for said mechanism mounted on said truck, guiding means for said mechanism mounted on said reciprocatory support, said guiding means on said support being adapted to register with said guiding means in a selected storage compartment, and means for selectively shifting said support with its guiding means and mechanism under said elevated guide tracks into operative position with a selected vehicle.

3. In a vehicle transfer apparatus having a movable structure adapted to simultaneously support a plurality of vehicles, stationary supports mounted on said movable structure for supporting the wheels of said vehicles, a transfer mechanism mounted on said movable structure and being adapted to move said vehicles off and onto said movable structure, and means independent of said transfer mechanism adapted to shift said transfer mechanism transversely to the direction of movement of the vehicles on said movable structure to positions for moving the vehicles off or onto said movable structure, said transfer mechanism being movable in such transverse shifting operation in a plane below said vehicle wheel supports.

4. In a vehicle transfer apparatus having a movable structure adapted to simultaneously carry a plurality of vehicles, stationary guides mounted on and extending across said structure transversely to the path of movement of said structure for supporting and guiding the vehicle wheels, a single transfer mechanism movable on said structure in a direction transversely to said guides and off and onto said structure in a direction parallel to said guides, and means for moving said transfer mechanism into operative transfer engagement for a selected vehicle positioned on or off said structure, said transfer mechanism being movable by said means in a plane below said guides.

5. In a vehicle transfer apparatus as embodied in claim 3, and including said shifting transfer means comprising a reciprocatory support.

6. In a vehicle transfer apparatus as embodied in claim 4, and including said means comprising a reciprocatory support.

7. In a vehicle transfer apparatus having a movable structure adapted to simultaneously support a plurality of vehicles, a plurality of elevated guideways for the wheels of the vehicles mounted on said structure, means mounted on said structure and reciprocable below said guideways and transversely thereof, and a single mechanism mounted on said means and reciprocable therewith, said mechanism being adapted to be moved by said means selectively into register and engagement with any of the vehicles to move said vehicles off or onto any of the guideways, said means and said mechanism being movable in a plane below said guideways.

8. A vehicle transfer apparatus as embodied in claim 7, in combination with a plurality of storage compartments having elevated guideways for the wheels of the vehicles to be stored therein and separate guiding means for said mechanism mounted on said reciprocable means.

9. In a vehicle transfer apparatus as embodied in claim 7, and including motor-driven means for propelling said structure and said reciprocable means, and separate motor-driven means connected to said mechanism for propelling said mechanism on and off said reciprocable means.

10. In car transfer apparatus as defined in claim 1, including said shifting means comprising a reciprocatory support for said mechanism mounted on said structure.

11. In car transfer apparatus, a structure adapted to support a plurality of cars placed side by side, a plurality of elevated tracks mounted on said structure to guide the wheels of the cars, mechanism adapted to be moved beneath said tracks and to contact a selected car and to move same off or onto said tracks, and means for moving said mechanism into operative position with a selected car.

12. The combination with a structure having a plurality of elevated tracks to guide the wheels of a plurality of cars placed side by side on said tracks, of means adapted to contact a selected car and to move the car on a pair of said tracks to another location and vice versa, said car moving means being movable beneath said elevated tracks, transversely thereof or longitudinally thereof, and means for selectively moving said car moving means underneath the cars and said tracks into operative relation with the cars.

13. The combination with a plurality of elevated tracks arranged to guide the wheels of a plurality of cars placed side by side on said tracks, of a mechanism movable below said tracks and transversely thereof and into operative position with a selected car, power-driven means for moving said mechanism transversely of said trucks, and separate power-driven means on said mechanism for engaging a selected car and moving same on a pair of said elevated tracks.

14. Vehicle handling apparatus including a movable structure adapted to carry a plurality of vehicles placed side by side, a plurality of elevated tracks on said structure arranged to guide the wheels of the vehciles, means for moving said structure, vehicle transfer mechanism adapted to be moved beneath and transversely to said tracks into register with a selected vehicle, vehicle-engaging means connected with said transfer mechanism adapted to engage and move such selected vehicle off or onto said movable structure, an electric motor for actuating said vehicle-engaging means, and a spring-controlled switch for breaking the circuit to said motor upon a predetermined pressure application of said vehicle-engaging means to the vehicle.

15. Vehicle handling apparatus including a plurality of elevated tracks adapted to support the wheels of a plurality of vehicles placed side by side on said tracks, vehicle transfer mechanism adapted to be moved beneath said tracks and transversely thereof into register with a selected vehicle, vehicle-engaging means associated with said transfer mechanism and adapted to engage and move such selected vehicle off or onto said tracks, a motor for actuating said vehicle-engaging means, and spring-actuated means for arresting the movement of said motor and vehicle-engaging means upon a predetermined pressure application of said vehicle-engaging means to the vehicle.

16. Vehicle handling apparatus including a plurality of elevated tracks adapted to support and guide the wheels of a plurality of vehicles placed side by side on said tracks, vehicle transfer mechanism adapted to be moved beneath said tracks and transversely thereof into register with a selected one of said vehicles, means on said transfer mechanism for lifting one end of the selected vehicle to afford the movement of the vehicle on a pair of wheels at the other end of the vehicle, motor-driven means for moving said transfer mechanism transversely to said tracks, separate motor-driven means for moving said transfer mechanism longitudinally of said tracks, and motor-driven means for operating said lifting means.

FRANK J. SCHRAEDER, Jr.